United States Patent
Steiro

(10) Patent No.: US 10,125,332 B2
(45) Date of Patent: Nov. 13, 2018

(54) HYDRO-FUEL, METHOD OF MANUFACTURE AND METHOD OF OPERATING A DIESEL ENGINE

(71) Applicant: Karl Jens Steiro, Drammen (NO)

(72) Inventor: Karl Jens Steiro, Drammen (NO)

( * ) Notice: Subject to any disclaimer, the term of this patent is extended or adjusted under 35 U.S.C. 154(b) by 12 days.

(21) Appl. No.: 15/274,380

(22) Filed: Sep. 23, 2016

(65) Prior Publication Data

US 2018/0086996 A1    Mar. 29, 2018

(51) Int. Cl.

| | | |
|---|---|---|
| *C10L 1/32* | (2006.01) | |
| *C10L 10/02* | (2006.01) | |
| *C10L 1/12* | (2006.01) | |
| *F02M 25/022* | (2006.01) | |
| *F02D 19/06* | (2006.01) | |
| *F02D 19/08* | (2006.01) | |
| *F02D 19/12* | (2006.01) | |
| *F02B 3/06* | (2006.01) | |

(52) U.S. Cl.
CPC ............... *C10L 1/328* (2013.01); *C10L 1/12* (2013.01); *C10L 10/02* (2013.01); *F02D 19/0644* (2013.01); *F02D 19/0671* (2013.01); *F02D 19/081* (2013.01); *F02D 19/12* (2013.01); *F02M 25/0224* (2013.01); *F02M 25/0228* (2013.01); *C10L 1/125* (2013.01); *C10L 1/1208* (2013.01); *C10L 2200/0277* (2013.01); *C10L 2200/0295* (2013.01); *C10L 2250/084* (2013.01); *C10L 2270/026* (2013.01); *C10L 2290/146* (2013.01); *C10L 2290/60* (2013.01); *F02B 3/06* (2013.01)

(58) Field of Classification Search
CPC .......... C10L 10/10; C10L 10/02; C10L 1/328; C10L 1/12; C10L 1/1208; C10L 1/125; C10L 2200/0295; C10L 2200/0277; C10L 2270/026; C10L 2250/084; C10L 2290/60; C10L 2290/146; F02M 25/0224; F02M 25/0228; F02D 19/0644; F02D 19/0671; F02D 19/081; F02D 19/12; F02B 3/06
See application file for complete search history.

(56) References Cited

U.S. PATENT DOCUMENTS

| | | | | |
|---|---|---|---|---|
| RE35,237 E | * | 5/1996 | Gunnerman | C10L 1/023 123/1 A |
| 2010/0095580 A1 | * | 4/2010 | Suzuki | C10L 1/328 44/301 |
| 2010/0219260 A1 | * | 9/2010 | Matsuoka | B01F 3/0446 239/8 |

FOREIGN PATENT DOCUMENTS

JP         2004076608 A    *    3/2004

* cited by examiner

*Primary Examiner* — Latosha Hines
(74) *Attorney, Agent, or Firm* — Hoffman Warnick LLC

(57) ABSTRACT

There is described a hydro-fuel composition of a water solution containing hydrogen, wherein the water solution has less than 1000 ppm total dissolved solids, and an oxidation reduction potential of less than −250 milliVolts. The hydro-fuel composition can be used in a diesel engine after the temperature of the diesel engine reaches a temperature of 80° C. to 90° C.

9 Claims, 1 Drawing Sheet

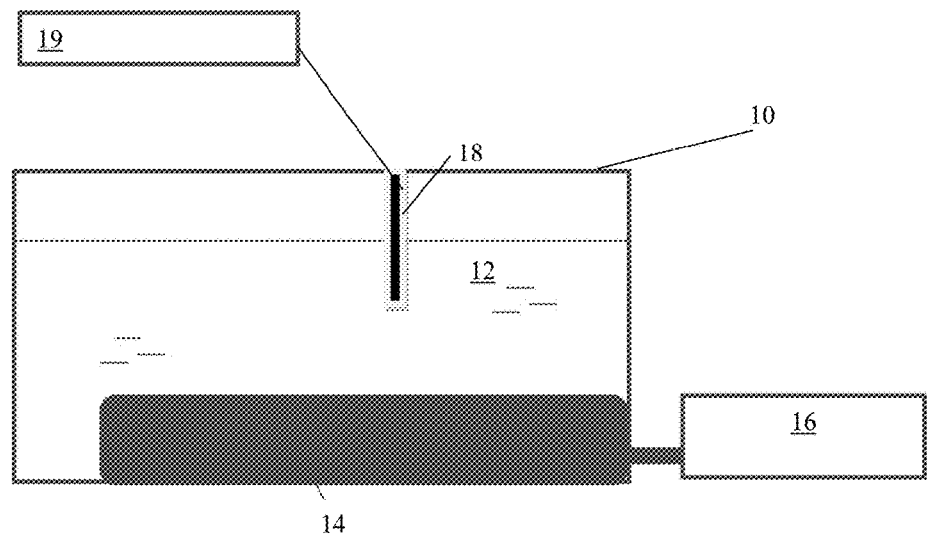

US 10,125,332 B2

HYDRO-FUEL, METHOD OF MANUFACTURE AND METHOD OF OPERATING A DIESEL ENGINE

BACKGROUND

Field of Use

The disclosure is directed to hydro-fuels, a method of manufacture of the hydro-fuel and a method of operation of a diesel engine using the hydro-fuel.

Background

Diesel engines are used in for transporting goods in cargo container ships. The amount of fuel used by such ships is a huge cost. Additionally, such engines produce pollutants such as nitrogen oxides ($NO_x$). The ocean transport industry (International Maritime Organization IMO) has promulgated new regulations for $NO_x$ emissions. This requires a significant upgrade to diesel engine technology.

There is a requirement for more efficient diesel engines. There is a need for diesel engines that emit less pollutants during operation. Current technology has not been able to address the new standards.

SUMMARY

According to an embodiment, there is described an hydro-fuel composition. The composition includes a water solution containing hydrogen, wherein the water solution has less than 1000 ppm total dissolved solids, and an oxidation reduction potential (ORP) of less than −250 milliVolts (mV).

According to another embodiment, there is provided a process of manufacturing a hydro-fuel. The process includes providing water having less than 1000 ppm total dissolved solids and an oxidation reduction potential of −250 mV or less. The process includes introducing hydrogen gas through a porous metal member immersed in the water while monitoring the oxidation reduction potential of the water; and stopping the hydrogen gas when the oxidation reduction potential of the water is less than −250 mV to produce the hydro-fuel.

According to another embodiment, there is provided a process for operating a diesel engine. The process includes comprising providing diesel fuel to the diesel engine during startup. The process includes monitoring a temperature of the diesel engine and injecting a hydro-fuel comprising water containing hydrogen, wherein the hydro-fuel has less than 1000 ppm total dissolved solids, an oxidation reduction potential of between about −250 along with the diesel when an operating temperature of the diesel engine reaches between 80° C. to 90° C.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIG. 1 depicts a device used to create the hydro-fuel disclosed herein.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Disclosed herein is a process that uses hydrogen gas and water to create a hydro-fuel. The hydro-fuel can be injected into a diesel engine to supplement the use of diesel fuel. The process of producing the hydro-fuel includes obtaining a supply of hydrogen gas. The hydrogen gas can be obtained through on-site production or purchased and delivered to the facility producing the hydro-fuel. The hydrogen gas is mixed with a prepared water solution to create a hydro-fuel. The hydro-fuel is stable if kept in a pressurized container.

After preparation of the hydro-fuel, the hydro-fuel is mixed with diesel fuel and introduced into a diesel engine that is operating at a temperature of about 80° C. to about 90° C. The weight ratio of hydro-fuel to diesel fuel is from about 1 to 2 (33 weight percent) to about 1 to 49 (2 weight percent). Generally speaking, diesel engines use the diesel fuel to help lubricate the cylinder. The introduction of water reduces the lubrication and thus increases the over heating potential in the engine. Therefore, the temperature of the diesel engine is monitored during operation. In addition, when an engine requires more torque, the ratio is lessened to provide more power.

A computer monitoring system ensures the diesel engine is performing optimally. A controller is provided that monitors the hydro-fuel:diesel fuel ratio as the power requirements change. For a generator that maintains a basic consistent load requirement there is little variability in the hydro-fuel:diesel fuel ratio. The operation of the diesel engine is initiated with 100 percent diesel fuel and when the temperature gauge indicates the temperature is at operational temperature the hydro fuel will be slowly added. During operation, a constant torque and RFP (power) is maintained which changes the hydro-fuel:diesel fuel ratio.

The disclosed process for producing the hydro-fuel injects hydrogen gas into a water-based solution. The underlying theory and operational physics behind the process is the conversion of water to steam. At atmospheric pressure the expansion is between 1600:1 and 1700:1. This expansion within the compression chamber of the diesel engine provides the energy to drive the piston. It is theorized that the hydro-fuel is essentially transforming a diesel engine into a "steam engine." Diesel fuel as an expansion of approximately 700:1 when it is ignited. Water is about 1600-1700:1. The additional expansion converting the water to steam provides the additional expansion to maintain power. The diesel fuel becomes the accelerant to transform the water to steam.

Normal working temperature in a diesel engine is from about 80° C. to about 90° C. Adding regular water rather than the hydro-fuel and does not turn the water into steam while maintaining engine power. This results in the power of the engine being reduced.

It is also believed that the hydro-fuel mixed with diesel fuel provides more complete combustion of the diesel fuel mixture. The exhaust will have a reduction of carbon and nitrogen pollutants. The reduction of pollutants is in part the improved combustion of the diesel fuel and the fact that the hydro fuel which is pollutant free (water is the only exhaust). The hydro-fuel reduces the amount of diesel fuel used and thus reduces the percentage of particles released.

The fuel can be used in any diesel engine and reduces the amount of diesel fuel used while lowering the amount of pollutants produced by the diesel engine.

Manufacture of Hydro-Fuel

FIG. 1 shows how the hydro-fuel disclosed herein may be made, according to embodiments. A container 10 is filled with water 12. A porous metal member 14 or tube is immersed in the water 12. The porous metal member 14 is connected to a hydrogen gas supply 16. An oxidation reduction probe 18 continually measures the ORP of the water. Display 19 provides the oxidation reduction potential measured by probe 18.

Oxidation reduction potential (also known as redox potential, oxidation/reduction potential, ORP) is a measure of the tendency of a chemical species to acquire electrons and thereby be reduced. ORP of water is measured in millivolts (mV) using an ORP meter. A positive ORP reading indicates that a substance is an oxidizing agent. The higher the reading, the more oxidizing it is. A negative ORP reading indicates that a substance is a reducing agent. The lower the reading, the more anti-oxidizing it is. Untreated water has a positive ORP value. The water 12 initially has an ORP of 200 mV or more.

The water 12 has less than 1000 parts per million (ppm) total dissolved solids. In embodiments the water has less than 800 ppm total dissolved solids, or less than 600 ppm total dissolved solids. Hydrogen gas is passed through a porous metal member 14 immersed in the water 12. Hydrogen gas supply 16 provides the gas to the porous metal member. The porous metal member creates "nano bubbles" of hydrogen gas. These nano bubbles infuse the water 12 and create a supersaturated solution of hydrogen in water. Hydrogen gas is passed through the porous metal member 14 until the ORP reaches a level of at least −250 mV. In embodiments, the ORP should reach at least −250 mV. The more negative the ORP the greater the amount of hydrogen in the water.

The hydro-fuel is ready for use when the desired ORP level is reached. If the hydro-fuel is to be used later it can be stored in a pressurized container. A pressure of 100 psi or greater is required to store the hydro-fuel. The hydro-fuel can be manufactured on site for immediate use in a diesel engine.

Use of Hydro-Fuel in a Diesel Engine

The hydro-fuel requires immediate mixing with the diesel fuel prior to introduction to an injection pump which supplies the mixture to the diesel engine. The mixing is done right before the fuel is provided to the injection pump of the diesel engine to reduce time for the hydrogen to separate from the water. This maintains the mixing of the diesel fuel and the hydro-fuel. The mixer can be any mechanical mixing device or a mixing tube which creates an emulsion of the hydro-fuel and the diesel fuel. The diesel engine must be at steady state operating temperature prior to using the hydro-fuel. Most diesel engines utilize a control system that monitors RPM and torque and adjusts the diesel fuel as required. A retrofit of such a system that includes the additional flow of the hydro-fuel and diesel fuel mixture according to engine needs. For example, if the diesel engine in losing power we would reduce the proportion of hydro fuel into the mixture. This means an operating temperature of about 80° C. to about 90° C. is maintained in the diesel engine. During shut down of the diesel engine the hydro-fuel supply is stopped and the diesel engine is run on pure diesel fuel for a period of time sufficient to remove any moisture from the engine. The engine should run for at least three minutes on pure diesel after the hydro fuel has been stopped. This is sufficient to burn off any water residue and reduce oxidation in the cylinder.

Operating temperature of a diesel engine is between about 80° C. to about 90° C. Diesel ignites at about a temperature of 275° C. depending on the grade of the diesel fuel. After the explosion the engine drops in temperature to the 80° C. to about 90° C. level. This is considered the operating temperature and is the temperature displayed on the engine temperature gauge.

The use of the hydro-fuel described herein provides a significant cost savings in diesel engines while reducing pollutants.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A process for operating a diesel engine comprising:
   providing diesel fuel to the diesel engine during startup;
   monitoring a temperature of the diesel engine;
   injecting a hydro-fuel comprising water solution containing hydrogen, wherein the water solution has less than 1000 ppm total dissolved solids, an oxidation reduction potential of less than about −250 millivolts (mV), and diesel fuel to the diesel engine when the temperature of the engine reaches between 80° C. to 90° C.;

stopping the injection of the hydro-fuel while continuing to provide diesel fuel during shutdown of the diesel engine; and running the diesel engine on diesel fuel for a period of time sufficient to remove any moisture from the diesel engine.

2. The process according to claim 1, wherein a weight ratio of hydro-fuel to diesel fuel is from about 1 to 2 to about 1 to 49.

3. The process according to claim 1, wherein the water solution has less than 800 ppm total dissolved solids.

4. The process according to claim 1, wherein the water solution has less than 600 ppm total dissolved solids.

5. A process for operating a diesel engine comprising:
starting the diesel engine by providing diesel fuel to the diesel engine;
monitoring a temperature of the diesel engine;
when the temperature of the diesel engine reaches steady state, injecting a hydro-fuel comprising water solution containing hydrogen, wherein the water solution has less than 1000 ppm total dissolved solids, an oxidation reduction potential of between about −250 millivolts (mV), and diesel fuel to the diesel engine;

stopping the injection of the hydro-fuel while continuing to provide diesel fuel during shutdown of the diesel engine; and running the diesel engine on diesel fuel for a period of time sufficient to remove moisture from the diesel engine.

6. The process according to claim 5, wherein the water solution has less than 800 ppm total dissolved solids.

7. The process according to claim 5, wherein the water solution has less than 600 ppm total dissolved solids.

8. The process according to claim 5, wherein the diesel engine is run for at least 3 minutes on pure diesel fuel during shutdown of the engine.

9. The process according to claim 5, wherein a weight ratio of hydro-fuel to diesel fuel is from about 1 to 2 to about 1 to 49.

* * * * *